Oct. 30, 1928.

D. C. DAVIS 1,689,195

THRUST COLLAR EQUALIZATION

Filed Oct. 6, 1922     2 Sheets-Sheet 1

David C. Davis
INVENTOR

WITNESSES:
W. S. Beckley

Oct. 30, 1928.

D. C. DAVIS 1,689,195

THRUST COLLAR EQUALIZATION

Filed Oct. 6, 1922

2 Sheets-Sheet 2

Patented Oct. 30, 1928.

1,689,195

UNITED STATES PATENT OFFICE.

DAVID C. DAVIS, OF CHESTER, PENNSYLVANIA, ASSIGNOR TO WESTINGHOUSE ELECTRIC AND MANUFACTURING COMPANY, A CORPORATION OF PENNSYLVANIA.

THRUST-COLLAR EQUALIZATION.

Application filed October 6, 1922. Serial No. 592,881.

My invention relates to a method of and apparatus for the relative adjustment of the respective thrusts assumed by the elements of a multiple-collar thrust bearing and it has for its object to provide apparatus of the character designated which shall be simple, inexpensive and highly effective in operation, particularly in that it shall be free of moving equalizing levers and similar elements.

Figure 1:
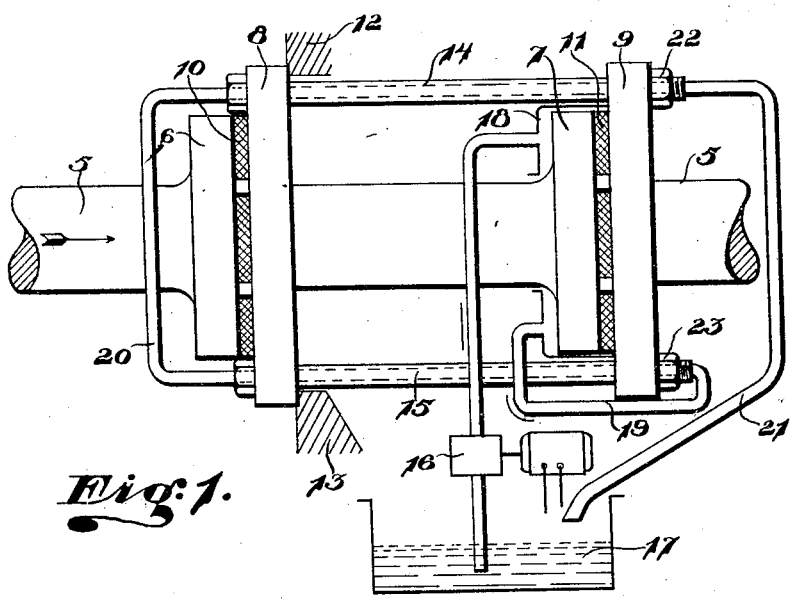
Figure 3:
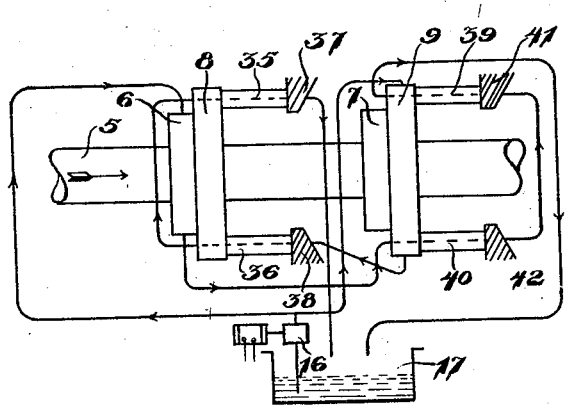
Figure 2:
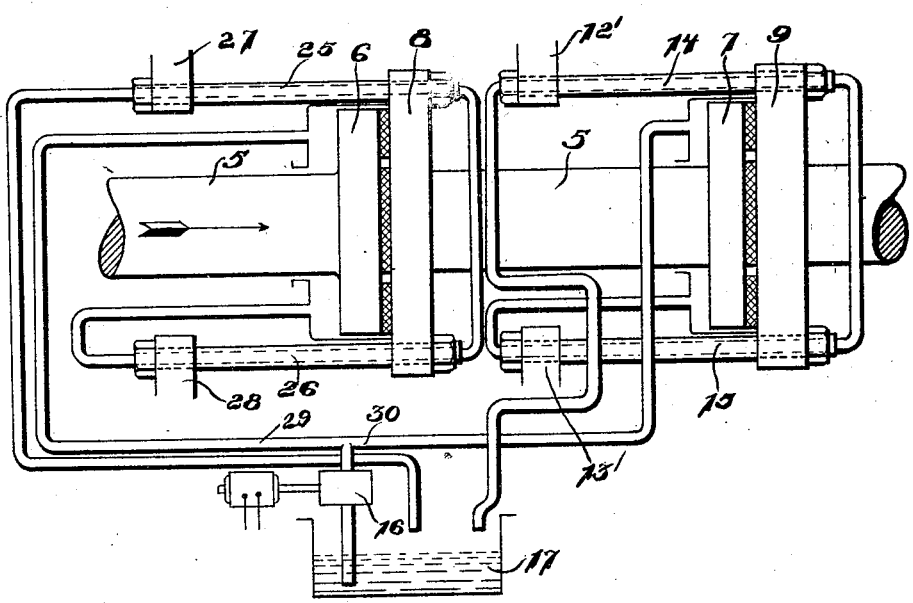

Referring to the accompanying drawings, Fig. 1 is a side view, partially in section and partially in elevation, of a multiple-collar thrust bearing embodying one form of my invention; Fig. 2 is a similar view of another and preferred form of my invention and Fig. 3 is a diagrammatic view illustrating still another modification.

In the operation of large thrust bearings, it has been found inexpedient to transmit the entire thrust to a single collar, inasmuch as the collar assumes a large diameter with resultant high peripheral speeds.

It has, therefore, been proposed to provide a multiplicity of thrust collars all encircling a common shaft and to transmit a given proportion of the total thrust load to each of said collars.

It has hitherto proven very difficult to properly adjust the respective loads carried by the different collars, and to this end it has been proposed to employ complicated systems of equalizing levers which have been open to the objection that they embodied a plurality of knife-edge pivots and other elements tending to cause inaccuracy and other difficulties.

Inasmuch as it is essential to well lubricate all thrust collars, I have found that an excellent adjustment of the relative thrusts may be secured by carrying one or more thrust collars by tension members and by then passing the lubricating oil from a given collar in thermal relation to the associated tension members, whereby an undue rise in the temperature of the oil flowing from a given collar because of excessive thrust pressure thereat, tends to lengthen the associated tension members and to relieve the pressure on said collar.

In a converse form of my invention, I may carry, for example, two collars on compression struts and I may then pass the oil from one collar in thermal relation to the struts of the other collar and vice versa, whereby an increase in the oil temperature at one collar tends to move the other collar against the thrust, causing said other collar to assume a greater proportion of the total thrust.

Referring to Fig. 1 of the accompanying drawings for a more detailed understanding of my invention, I show a shaft at 5—5, exerting a thrust in the direction of the arrow. The shaft 5 is provided with two thrust flanges 6 and 7 bearing respectively against thrust receiving collars 8 and 9. As illustrated, I provide the thrust collars 8 and 9 with tilting shoes 10 and 11 of the well-known Kingsbury type, but as this feature of the structure forms no part of the present invention, no detailed description of said shoes is necessary.

The collar 8 may transmit its proportion of the thrust directly to fixed members 12 and 13 and the collar 9 is carried from the collar 8 through hollow tension members or bolts 14, 15 and others (not shown).

Lubricating oil is supplied to both the thrust collars but, inasmuch, as the oil supply to the collar 8 plays no part in this form of the invention, I have not illustrated the same. Oil is continually passed over the thrust-receiving shoes of the collar 9, however, as by a motor-driven pump 16, deriving its supply from a container 17 and supplying it to the thrust bearing 7—9. I have illustrated no specific method of actually supplying the oil to the thrust shoes, but have merely indicated a casing 18 surrounding the thrust bearing. After having passed over the thrust shoes, the oil is taken from the bearing 7—9 through a conduit 19 and passed through the bolt 15, thence through a conduit 20 and the bolt 14, it is returned to the receiver 17 through a conduit 21.

Having thus described an arrangement embodying one form of my invention, the operation thereof is as follows: The parts are preferably so designed that in the cold state, substantially all of the thrust is assumed by the collar 9, which thrust is transmitted through the contracted bolts 14 and 15 to the collar 8 and thence to the fixed members 12 and 13. Rotation of the shaft generates a relatively high temperature in the oil supplied from the collar 9 and the resultant flow of hot oil through the members 14—15 causes expansion thereof with the result that the collar 9 is spaced a slightly greater distance from stationary collar 8 so that a proportional part of the thrust is assumed by the collar 8 and by suitable adjustment of nuts 22 and 23 on the bolts 14 and 15, any desired adjustment of the relative loads of the collars 8 and 9 may be effected.

The structure thus shown in Fig. 1, while operable under certain conditions, is open to the great disadvantage that changes in the room temperature tend to change the relative loads. Thus in a marine thrust bearing, the passage from a cold ocean current into a warm ocean current might materially influence the respective loads. I may, therefore, employ the structure shown in Fig. 2, wherein compensating means are provided and a more equable disposition of the pressures effected.

A shaft 5—5, as before, is provided with thrust flanges 6 and 7 seated against thrust collars 8 and 9, respectively, and the collar 8 is carried by tension members 25, 26 fastened to fixed members 27 and 28, respectively. The collar 9 is carried by hollow tension members 14 and 15 as before, supported from fixed members 12' and 13'.

Lubricating oil is drawn from a reservoir 17 by a pump 16 as before, and thence passes into a divided conduit, one branch 29 leading to the bearing 6—8 and the other branch 30 leading to the bearing 7—9. The oil after passing through each bearing traverses the associated tension members and thence returns to the reservoir 17 where it is mingled before again traversing the lubricating system.

In operation, the system is initially adjusted by the position of the respective nuts on the tension members so that the thrusts assumed by the collars 8 and 9 are, for example, equalized and, in as much as both bearings are lubricated by oil from the common reservoir 17, the oil temperatures in the two systems tend to remain equal with equal expansion and contraction of the bolts 14—15 and of the bolts 25—26. Should either thrust collar, for any reason, tend to assume a disproportionate amount of the total thrust, the associated tension members are at once elongated by the resultant rise in the temperature of the corresponding oil stream and the thrust assumed by said overloaded collar tends to be relieved, being transferred to the other collar and at the same time the light thrust assumed by the other collar permits a reduction in the temperature of its oil stream with consequent contraction of its tension members and the assumption of greater load thereby.

Thus, it will be seen that any departure from the predetermined thrust distribution tends to at once set up a compensating action, moving the overloaded collar in the direction of the thrust and moving the underloaded collar against the thrust to restore the desired pressure conditions.

It should be particularly noted, that changes in the room temperature produce no effect on the relative pressures, merely causing equal expansion of all the tension members and permitting the entire shaft to move slightly in the direction of the thrust.

In the form of my invention shown in Fig. 3, the arrangement of shaft and collars is as in Fig. 2 with the exception that the collar 8 is carried by compression struts 35 and 36 bearing against fixed stops 37 and 38 and the collar 9 is carried by hollow compression struts 39 and 40 bearing against fixed stops 41 and 42, respectively. Oil is taken from a common reservoir, as before, but after traversing a given thrust bearing it is not passed through the associated compression members but is rather passed through the compression members of the other collar and vice versa, all as indicated by the arrows on the oil conduits. Thus it will be seen that the overload of one collar tends to heat and expand the compression struts of the other collar, causing said other collar to move against said thrust and to assume more load and vice versa.

I have found that thermal adjusting means of the type herein shown is ideally adapted for the purpose indicated, inasmuch as the thermal expansion and contraction of a metal bolt or strut, while being but relatively small in amount, is nevertheless amply sufficient to effect the desired changes in the relative thrusts and, inasmuch, as these thermal forces are of great magnitude, they are amply sufficient to move a thrust collar an appreciable amount, even against a very heavy thrust. Furthermore the total absence of moving parts or pivots tends to permit great strength and solidity in the entire structure.

While, for cheapness, I may use steel as the material for the bolts or struts, where there is ample room for a member of considerable length, yet if it be desired to construct an exceedingly compact unit, I may, if desired, employ phosphor-bronze or some other material for the bolts or struts having a materially higher co-efficient of linear expansion than iron or steel.

If extreme compactness be desired, I may bring the members 7 and 9 in Fig. 2 into much closer relation to the members 6—8, disposing the bolts 14—15 in alternate relation with the bolts of the group 25—26, the collar 9 being sufficiently larger than the collar 8, or the collar 8 being cut away so as to permit of this construction.

While I have shown my invention in but three forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a multiple-collar thrust bearing, the combination with a thrust collar, of hollow tension members arranged to take the thrust from the collar, and means for passing lubricating oil over the thrust surfaces of said collar and then through said members, whereby an increase in the temperature of said oil tends to lengthen said members and permit movement of said collar in the direction of thrust.

2. In a multiple-collar thrust bearing, the combination with two thrust collars, of hollow tension members arranged to take the thrust from said collars, respectively, means for separately passing lubricating oil over the thrust bearing surfaces of each collar and then through the associated tension members, and for then equalizing the temperatures of the oil derived from both collars, and means for adjusting the collars, the adjustment being such that for equal oil temperatures in the two groups of tension members, the thrusts assumed by the respective collars tend to bear a predetermined relationship, whereby if the pressure upon one collar increases disproportionately, the associated oil stream is correspondingly heated, expanding the associated tension members and tending to relieve the pressure upon said collar and to transfer a portion thereof to the other collar.

3. In a multiple-collar thrust bearing, the combination with two thrust collars, of hollow tension members arranged to take the thrust from said collars, respectively, means for passing lubricating oil over the thrust bearing surfaces of each collar and then through the associated tension members, and for then equalizing the temperatures of the oil derived from the two collars, and means for adjusting the position of each collar, the adjustment being such that for equal oil temperatures in the two groups of tension members, the thrusts assumed by the respective collars are equal, whereby if the pressure upon one collar tends to increase disproportionately the corresponding oil stream is heated accordingly and tends to expand the associated tension members, relieving the excessive pressure upon said collar and tending to restore the desired equal thrust pressures upon the two collars.

4. In a multiple-collar thrust bearing, the combination with two thrust collars, of tension members arranged to take the thrust from said collars respectively, means for passing lubricating oil over the thrust bearing surfaces of each collar and thence in heat conducting relation with the associated tension members, and for then equalizing the temperatures of the oil derived from the two collars, and means for adjusting the position of each collar, the adjustment being such that for equal oil temperatures in the two groups of tension members, the thrusts assumed by the respective collars tend to bear a predetermined relationship, whereby if the pressure upon one collar increases disproportionately, the associated oil stream is correspondingly heated, expanding the associated tension members and tending to relieve the pressure upon said collar and to transfer a portion thereof to the other collar.

5. In a multiple-collar thrust bearing, the combination with two thrust collars, of tension members arranged to take the thrust from said collars, respectively, means for passing lubricating oil over the thrust bearing surfaces of each collar and thence in heat conducting relation with the associated tension members, and for then equalizing the temperatures of the oil derived from the two collars, and means for adjusting the position of the collars, the adjustment being such that for equal oil temperatures in the two groups of tension members, the thrusts assumed by the respective collars are equal, whereby if the pressure upon one collar tends to increase disproportionately, the corresponding oil stream is heated accordingly and tends to expand the associated tension members, relieving the excessive pressure upon said collar and tending to restore the desired equal thrust pressures upon the two collars.

6. In a thrust bearing, the combination of a plurality of thrust flanges, thrust receiving collars cooperating respectively with the flanges, and spacing means for varying the space between the collars, the length of said spacing means varying with the heat generated at one of the collars.

7. In a thrust bearing the combination of a movable element, a plurality of thrust flanges secured to the movable element, thrust receiving collars cooperating respectively with the flanges, supporting means for the collars including spacing elements arranged between the collars, and means providing for the transmission of heat generated at one of the collars to the spacing elements.

8. In a thrust bearing, the combination of a movable element, a plurality of thrust flanges secured to the movable element, thrust receiving collars cooperating respectively with the flanges, means for supporting the thrust collars, said supporting means being so constructed and arranged as to cause a relative movement between the collars in response to heat generated at the respective collars whereby the thrust is distributed therebetween.

In testimony whereof, I have hereunto subscribed my name this 29 day of Sept., 1922.

DAVID C. DAVIS.